Dec. 13, 1938. J. S. COMSTOCK 2,139,881
COFFEE INFUSION APPARATUS
Filed Dec. 31, 1934 2 Sheets-Sheet 1
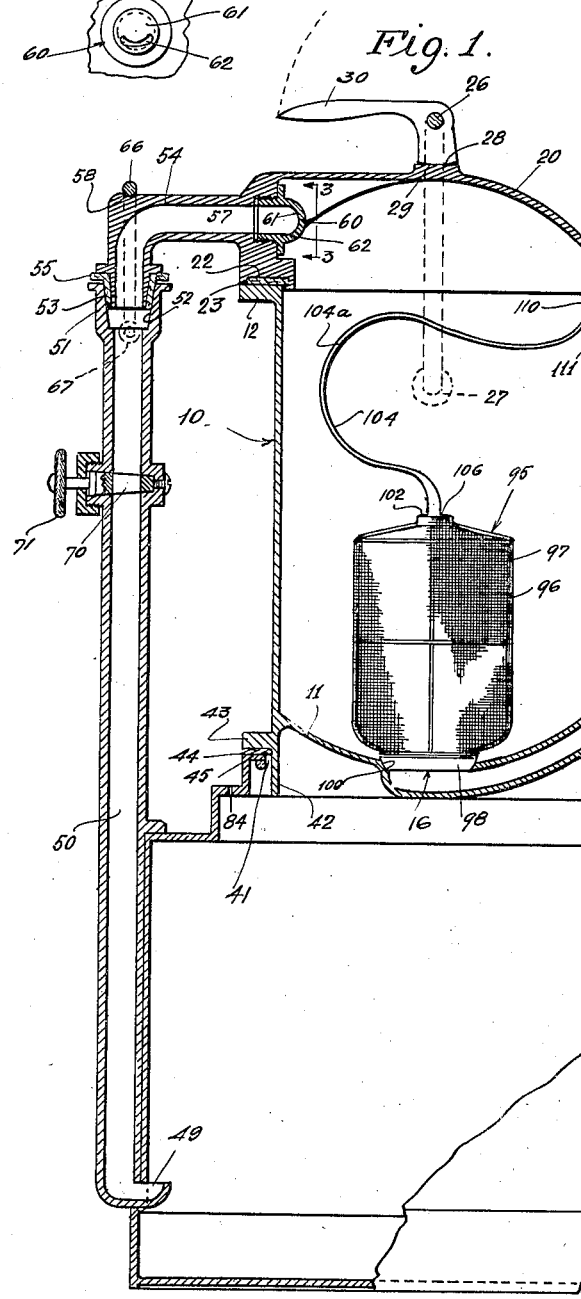
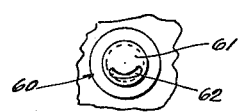
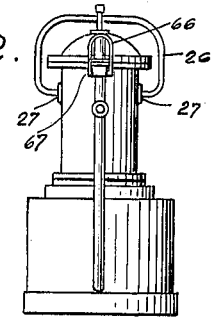
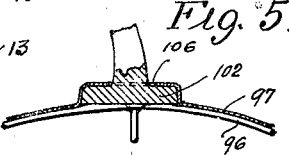
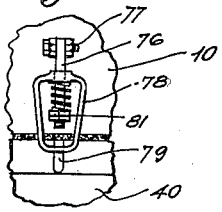
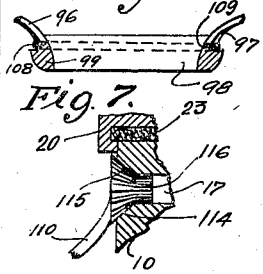
Inventor.
John Sterling Comstock.
Attorney.

Inventor
John Sterling Comstock.

Attorney.

Patented Dec. 13, 1938

2,139,881

UNITED STATES PATENT OFFICE 2,139,881

COFFEE INFUSION APPARATUS

John Sterling Comstock, Hollywood, Calif.

Application December 31, 1934, Serial No. 759,896

4 Claims. (Cl. 53—3)

This invention relates to means for making coffee infusions, it being the general object of the invention to provide an improved coffee infusion apparatus capable of making a coffee beverage of improved character.

A large number of methods for making a coffee beverage are known, differing in the amount of heat used, the time of extraction, the pressure maintained in the infusion chamber, in whether or not the coffee is subjected to boiling, etc. Present methods of making coffee may be divided into filtration-bed methods, in which the ground coffee forms a mass through which the water seeps, and methods in which the coffee particles float freely in a relatively large quantity of hot water. The old-fashioned method consisting in boiling the coffee in a coffee pot is an example of the latter method, while so-called "drip" and percolator coffee making methods belong in the first mentioned category. In the instance of coffee grounds floating freely in water, the coffee grounds, until thoroughly wetted or stirred, will float as a cake or crust at the surface, and when wetted sink and form a bed at the bottom of the container.

Attempts have been made to extract the coffee beverage by a general method which involves use of a tightly closed chamber within which the ground coffee is placed, the chamber being provided with an inlet channel for introduction of hot water under pressure, and an outlet channel, controlled by a filter, through which the coffee beverage is finally discharged. Such a method and apparatus has certain attractive theoretical advantages, in that it lends itself to many convenient and labor-saving forms of coffee making equipment, and also in that it prevents escape of the aromatic essences of the coffee bean, so desirable to the coffee beverage. In practice, however, certain difficulties have been encountered, and the process in question has not heretofore met with any measure of success. For instance, without the provision of some preventive means, the pressure conditions within the chamber cause the ground coffee to pack tightly in a bed. This effect causes flow of the coffee through the chamber to be restricted to such an extent as to nullify entirely the advantages of the method. Further, the tight packing of the grounds causes certain portions of the coffee to be shielded from the action of the water, while other portions, because of the larger amount of water with which they come into contact, are over-extracted. A bitter and characterless beverage results. And in addition to this, for some reason not easily determined, a change of color takes place in the beverage under the conditions mentioned, unless the temperature of the water is reduced far below that usually considered efficient in extracting coffee. This change may be detected even as the coffee is discharged from the chamber, but as the liquid stands, it changes markedly to a dirty brown color. An increasing bitterness accompanies this change.

It is an object of the present invention to provide an improved coffee-making apparatus for making coffee by the general method discussed in the preceding paragraph, but which overcomes all of the previously encountered disadvantages and disabilities of said method. It is a further object of the invention to provide a coffee making apparatus which is highly conducive to bringing about an extraction and preservation of the desirable and more volatile aromatic oils of the coffee, while permitting the dissolving of but a minimum quantity of certain coffee elements which have a deleterious effect upon the beverage, or are unwholesome in their effect upon the human system, and also to provide an apparatus in which the coffee infusion undergoes no chemical changes which affect adversely the fine and delicate coffee flavor which can alone be obtained from the untransformed aromatic and relatively more volatile elements of the ground coffee bean.

In accordance with my present invention, the coffee infusion is formed in a closed chamber. Preferably, the chamber containing a suitable measure of dry ground coffee, after being closed, is subjected for a short period of time to preliminary heating, in the absence of moisture. This dry preheating has the effect of releasing certain aromatic vapors from the coffee, which are preserved within the chamber to be absorbed by the later introduced water, and also apparently prepares for instant release the more volatile aromatic oils, so that extraction and assimilation of such elements by the hot water introduced later will be extremely rapid. However, this step, while definitely enhancing the flavor and character of the final beverage, may be eliminated, if desired, without destroying the beneficial results obtained in the remainder of the process.

After preheating, or if preheating is not used, after closing of the extraction chamber, hot water is introduced to the chamber, and at the same time some suitable agency is employed to maintain the liquid within the chamber in such a state of agitation that the coffee grounds are maintained in free suspension in the liquid, being repeatedly submerged below the surface, and at the same time being prevented from settling on the bottom of the chamber. The introduced water is under pressure, and may be at a temperature near boiling temperature at atmospheric pressure, or in other words near 100° C.

The agitation permits use of water at temperatures which with similar apparatus, have been found to cause turning of color in the coffee, or spoiling, if agitation were lacking. Agitation also assures that each grain of coffee will be exposed evenly and completely through the water bath, assuring as complete extraction as is desirable in a relatively short period of time. Because of the shortened time of extraction the baser, non-aromatic, woody elements, which are water soluble and come off in proportion to the duration of the extraction period, are obtained to but relatively small extent. Because hotter water can be and is used, extraction of the volatile parts of the ground coffee is speeded, and the extraction of the volatile elements and desirable oils of the coffee is highly promoted, while extraction of the baser, non-volatile elements is not correspondingly increased by the greater heat successfully employed in my process. With the use of the relatively hotter water possible in my process, therefore, the more desirable coffee elements are extracted with greater rapidity than is possible in other methods of the type employing a closed chamber, and the water need not be left in contact with the coffee grounds for a sufficient period of time to take off a large proportion of the purely water soluble substances of the bean, which are detrimental to the beverage. The result is an increase in obtainment of the volatile and more desirable coffee elements, accompanied by reduction in extraction of the undesirable substances of the coffee bean.

If vigorous agitation is not maintained under conditions mentioned, spoilage of the coffee inevitably results. The effect of which I speak is not simply failure to obtain the best coffee, but is a positive spoiling, probably due to some chemical change within the coffee, the coffee rapidly changing color and taking on a bitter taste. The facts of which I speak have been ascertained by test and experiment, and although I am not certain of the exact nature of the reactions which take place in the coffee under the conditions mentioned, my study and observation have led to the conclusion that when the coffee grounds are allowed to form a cake or bed in the presence of relatively high heat (approaching closely to 100° C.), there is a holding or confinement of particles of the released aromatic vapors between the packed grounds in minute bubbles which are surrounded by films of liquid containing in a relatively concentrated solution, certain reagents, probably acid in nature, dissolved from the woody fiber of the bean, and a destructive reaction of some nature is set up between these vapors and the reagents which come from the grounds. If, on the other hand, the bed of coffee is constantly broken up, or prevented from forming, the concentration of these reacting vapors and acids is much decreased, and the destructive transformation is effectively prevented.

It is a characteristic of a present preferred form of the invention that the hot water is introduced to a vapor tight coffee extraction or infusion chamber having a hot water inlet and a coffee infusion outlet, with a differential of pressure being maintained between said inlet and outlet such that the hot water is introduced to the chamber with sufficient velocity to establish the vigorous agitation required, and such that the coffee flows properly through the chamber. As stated previously, the water is introduced at a temperature which may closely approach 100° C., and the set of conditions thus established brings about very rapid extraction of the desired volatile and aromatic oils of the coffee, the described vigorous agitation of the water in the coffee is suspended preventing spoilage (deleterious physical or chemical change) of the beverage, as well as aiding extraction by assuring maximum exposure of each grain of coffee to the hot water. The hot water is left in contact with the coffee grounds only for a period sufficient to extract the "lighter" or more desirable elements of the coffee, and is then filtered off.

The beverage obtainable by this process has a distinctive character, being mellow and "soft" in taste, even when cheap coffees are used, the soft fibers of which give off, in most processes, a relatively large proportion of undesirable, acrid substances. It is possible, by shortening the time of exposure, to produce a beverage so mild that, if equally mild coffee were produced by any usual method, it would be called watery and characterless, yet coffee of such mildness will be palatable and delicious, when made by this process. An amount of the coffee bean can be used so small that, while with other methods the beverage would be watery and characterless, yet with this method, the beverage, while mild, will have character and will be palatable. By using equal amounts of coffee in a conventional process and in this process, and gauging the time and heat so that the strength of beverages will be about equal, the result will be that the coffe made by this process is far more aromatic, full bodied, "soft", and distinctive in character. The proportion of aromatic oils will be higher, and the proportion of baser acrid elements lower than in the coffee made by the usual method.

Moreover, from any definite quantity of ground coffee, more beverage of equal strength and equal quality can be extracted than by any other method of which I am aware. This is a definite commercial advantage if quality is to be sacrificed to quantity.

Finally, while it is usually expected that coffee, made by ordinary processes, will have become undrinkable if allowed to cool, and later reheated, it is my consistent experience that coffee made by this process can be allowed to cool and then reheated, and even cooled and reheated several times, after which the coffee will be still very nearly as good as when fresh. It may be cooled and kept for several days without appreciable deterioration.

The process as thus outlined may be carried out with special apparatus provided by the present invention. This apparatus is preferably of the general type involving a closed coffee extraction chamber, a means for injecting hot water thereto under pressure, provision being made for agitation of the liquid during the hot water injection, and an outlet conduit, protected by a filter, leading from the lower portion of the chamber. The injected water, maintained in a state of agitation, rises in the extraction chamber, suitable provision being made for displacement of air originally in the chamber, and when the water has risen to a predetermined level, by virtue of the pressure produced by introduction of further hot water, or by other means, the finished coffee is forced to flow out through the filter and outlet conduit to discharge from the chamber.

The various novel features of invention of my apparatus, as well as various objects, advantages and details of my invention not preliminarily mentioned, will be set forth in detail in the following detailed description, reference for this purpose being had to the accompanying drawings, in which:

Fig. 1 is a vertical medial section through a preferred form of apparatus in accordance with the invention;

Fig. 2 is a side elevation of the apparatus shown in Fig. 1, being a view looking at the device shown in Fig. 1 from the left as seen in that figure;

Fig. 3 is a detail taken as indicated by arrows 3—3 in Fig. 1;

Fig. 4 is a detail of a spring clamp;

Fig. 5 is a detail section of the upper end of the filter;

Fig. 6 is a detail section of the lower portion of the filter and its seat in the lower end of the extraction chamber;

Fig. 7 is an enlarged detail of an air vent and restricting plug;

Figure 8:
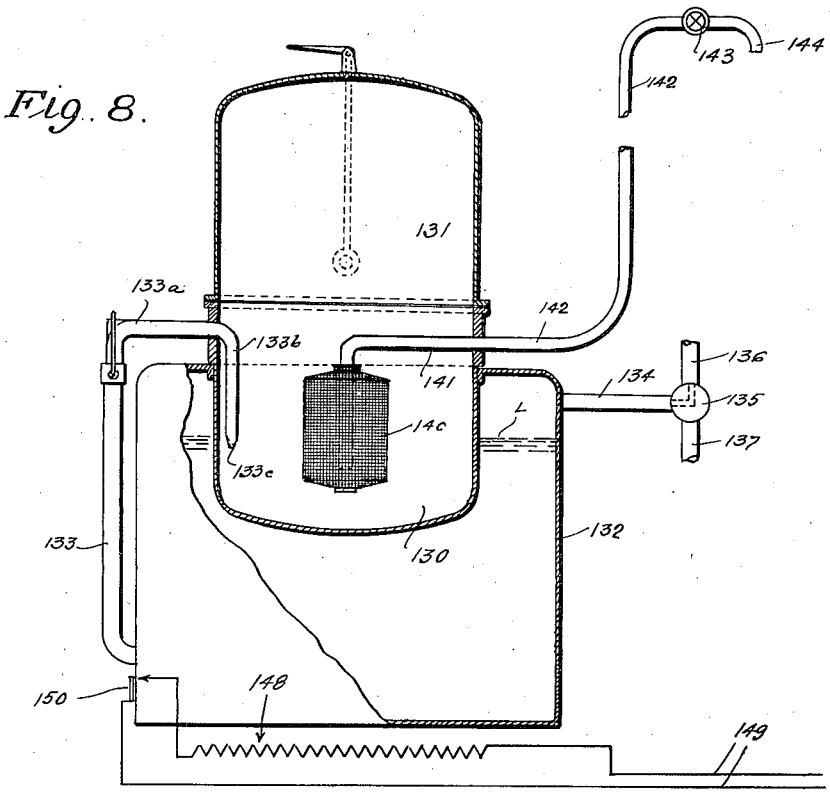
Fig. 8 is a diagrammatic view indicating a modified form of apparatus.

In Fig. 1 numeral 10 designates generally the coffee infusion or extraction chamber, this chamber being generally in the form of a vertically extending cylindrical casting. The lower end of the chamber is closed by a concave bottom wall 11. The upper end of the casting is open, and is provided with an external annular flange 12. Extending the length of one side of the chamber and underneath bottom wall 11 is an enlargement 13 formed with a coffee discharge conduit 15. This conduit 15 communicates with the interior of chamber 10 by way of an opening 16 in the chamber bottom, and leads to a coffee discharge passageway 17 formed in a spout 18 cast integrally with part 13. The spout 18 is near the upper end of the extraction chamber casting, as shown.

The upper end of the extraction chamber is closed by a removable top or dome 20, provided with an annular flange 21 adapted to seat on the aforementioned flange 12. Flange 21 is recessed in the manner shown at 22 to receive a flexible pressure-sealing washer 23, which is adapted to bear down on the upper face of flange 12 and to be pressed thereagainst to seal the extraction chamber in a pressure tight manner. This top or dome 20 is adapted to be clamped tightly down through the instrumentality of a bail 26 which is trunnioned on opposite sides of the chamber, as at 27, and a cam member 27 which is mounted for pivotal movement on bail 26 and has an arcuate cam surface 28 adapted to be engaged with a complementary seating surface 29 formed in the center of the dome top. Cam member 27 has a finger piece 30 by means of which it may be manipulated, and it will be understood that when the device is moved to the position of Fig. 1, the cam element presses top member downwardly and causes a slight compression of sealing washer 23 to seal the chamber in a pressure tight manner. To remove top member 20, it is only necessary to move finger piece 30 to an upright position which removes the cam member from its engagement with the top and permits the bail to be swung to one side and top member 20 to be removed.

In the form of my invention here shown, the coffee chamber as described rests on and extends through an annular opening in the upper wall of a water boiler 40. This boiler is simply a water chamber, of suitable capacity, and of any form desired, formed at the top with an opening of a diameter sufficient to pass the lower end 42 of chamber 10. Said chamber is formed near its lower end with an external annular flange 43 adapted to rest on a pressure sealing washer 44 placed on the annular shoulder 45 which defines the boiler opening 41.

Extending upwardly from one side of the boiler, and communicating with the boiler at a point 49 near the lower end thereof, is a vertically extending pipe or conduit 50. The upper end of this conduit 50 is preferably at substantially the level of the upper end of the extraction chamber flange 12, and is formed with an enlargement 51 having a conical seating surface 52 adapted to receive the conical shaped lower end 53 of a pipe-fitting member 54 formed integrally with extraction chamber top 20. A flexible pressure sealing washer 55 is shown placed between seating surface 52 and the conical lower end 53 of member 54, and serves to afford a pressure tight joint at that point. As clearly shown, fitting 54 is formed with a channel 57 which leads from the upper end of pipe 50 and opens within dome member 20 at a level somewhat above seating flange 21.

Threaded into the discharge end of passageway 57, within dome 20, is a water discharge nozzle 60, and in the preferred specific form here illustrated this nozzle embodies a rounded nose 61 provided with a substantially flat discharge orifice 62 (see Fig. 3). This orifice is offset from the center of the rounded nose, as shown, and the nozzle is positioned with the orifice on the lower side and disposed in a horizontal position, so that a flat, downwardly and outwardly directed jet of water issues therefrom. This jet of water strikes the surface of liquid within the extraction chamber at approximately its center area, this surface being established at a level approximately at the mouth of the dome, as will hereafter appear.

A clamp device is provided for tightly seating the conical end 53 of fitting 54 within its seat 52. For this purpose, I provide a bail 66 which is trunnioned at 67 on opposite sides of pipe 50, and is adapted to engage a seat 58 formed on the upper side of fitting 54, as clearly shown in Fig. 1. The length of the bail is such as to force fitting 54 downwardly somewhat, and to compress sealing washer 55, as the bail is forced upwardly on its seat 58, thus providing a pressure tight fit, as well as a connection that will not be apt to become disengaged with steam pressure within the conduit. It will be noted that in the position of Fig. 1, the bail rests in a slight depression formed in seating surface 58, so that there is no tendency for the bail to slip off its seat when pressure is exerted within the pipe.

Thus, in this preferred construction, dome or top 20 and water inlet pipe-fitting 54 are formed as a unit, and are removable from the apparatus together by disengaging bails 26 and 66.

It will be evident that bail 66 acting through chamber top 20 serves to hold the chamber downwardly against its seat 45 at the upper end of the boiler, there being, however, considerable give in this hold-down means alone. A spring clamp device 75 is additionally provided, preferably on the side of the coffee chamber which is opposite to pipe 50 and bail 66, and serves to complete the clamping of the extraction chamber down to the boiler. In the preferred form here shown, this clamp device embodies a link 76 pivoted at 77 on the side of the chamber, and a bail, or loop-like link member 78, the upper end of which slides vertically on link 76, and the lower end of which is adapted to engage below a catch 79 mounted on the boiler. A compression spring 80 is placed around link 76 between the upper end of loop 78 and a pair of adjustment nuts 81 screwthreaded on the lower end of link 76. It will be evident that bail 66 considered alone tends to hold the coffee extraction chamber 10 downwardly against its seat at the upper end of the boiler, but that without further provisions the extraction chamber could easily be lifted well above its seat on the sealing washer 44 and shoulder 45. The clamp device 75 is designed to hold the device tightly, but yieldingly, down against sealing washer 41, it being necessary to compress clamp spring 80 somewhat before loop 78 can be passed over catch 79. With a development of a certain pressure within the boiler, however, the downward force exerted on the extraction chamber by clamp spring 80 is overcome, and the extraction chamber lifts slightly to permit escape of steam in the crack so made. It will be obvious that the steam pressure at which the steam is so allowed to escape will depend upon the force necessary to overcome clamp spring 80. This force is adjustable by changing the position of nuts 81 on link 76, and the steam pressure at which discharge occurs may accordingly be adjusted by means of these adjustment nuts. It will thus be evident that the extraction chamber itself forms a steam blow-off valve, and that the pressure at which said valve opens is adjustable by screwing nuts 81 up or down on link 76. The purpose of these provisions will appear at a later point in the specification.

There is preferably provided in pipe 50 a shut-off valve 70, provided with a suitable hand wheel 71, as shown.

Preferably, a small bleeder hole 84 is provided in the top of the boiler, its purpose being to allow air in the boiler to escape during the warming-up process, thereby avoiding premature build-up of pressure and flow of luke warm water from the boiler. In case valve 70 be left open from the beginning or eliminated, this bleeder hole or equivalent is essential.

A cleaning port 87 is formed just above the juncture of conduit 15 with discharge spout passage 17, and this port is normally closed by a plug member 88 provided with a seating flange 89. This plug may have an extension 90 pivoted to the spout at 91, and the arrangement of parts may be such that its seating flange 89 is engaged on its upper face by a downwardly extending rim 92 formed on the flange portion of top member 20 when the top member is mounted on the extraction chamber. The cleaning plug thus is engaged by the extraction chamber top when said top is in place, so that the plug cannot come open during operation of the apparatus; when the extraction chamber top has been removed, however, the plug may be swung back to enable insertion of a cleaning brush through port 87 and into channel 15.

Numeral 95 designates the filter. This filter, in its preferred form, embodies a vertically elongated wire frame work 96, of substantially the form of a cylinder, covered by a cloth filter bag 97. Wire frame 96 is mounted at the bottom on a mounting ring 98, the lower end of which is formed with a rounded annular flange 99 adapted to be received within conical seat 100 formed in bottom wall outlet opening 16. With this arrangement, a good seat is afforded for ring 98 within seat 100 even though the filter may not always be placed in an exactly vertical position when it is placed in the extraction chamber. Affixed to the upper end of the filter frame is a disk 102, having extending upwardly therefrom a spring hold-down member 104. This hold-down spring has a bend at 104a, as shown, and has at its upper end a disengageable seat in the extraction chamber wall, whereby it presses downwardly in the upper end of the filter and holds the latter in place during operation of the apparatus. The nature of the engagement of the spring with the chamber wall as here shown will be described presently.

The cloth filter bag is drawn tightly around the lower end of the spring member, above disk 102, the upper end of the bag having a small hole 106 through which the spring member is inserted at the time the filter bag is placed on the filter frame. The filter bag fits snugly over the frame and extends downwardly over the upper portion of ring member 98, the lower end of the bag being held tightly in place by means of a drawstring 108 drawn tightly and fastened within an annular groove 109 formed in the exterior surface of said ring, in the manner clearly shown.

Hold-down spring 104 has at its upper end an enlargement 110 adapted to be engaged within the inner end of an air vent or passageway 111 formed in the chamber wall near the upper end thereof. This passageway is substantially opposite discharge spout passageway 17, and communicates therewith and with passageway 15 in the manner shown. Passageway 111 serves not only as a means for receiving and positioning the upper end of the filter hold-down spring, but also as an air outlet from the extraction chamber. It is necessary that this air outlet be more or less definite in size, and also that it be of a relatively restricted nature. In particular, the air outlet is of such size as to offer some resistance to the escape of pressure within the chamber, thus maintaining such pressure as will deter the coffee from boiling within the chamber at temperatures around 100° C., or higher, but which is of sufficient size to allow escape of air with sufficient velocity that excessive back-pressure will not be offered to the inlet jet during filling of the chamber, and neither will the coffee be forced out through the filter in any such quantity as to prevent the level within the chamber from rising to the desired height. In the specific apparatus here shown, I form the inner end of the air outlet with a conical seat 114, and provide a complementary conical seating surface 115 on spring end 110, which thus functions as a plug. Seating surface 115 however, is formed with a roughened or corrugated surface, so that there is a definite air leak provided between the plug and the outlet opening into which it is inserted. The enlarged spring end, or plug, has a similarly corrugated projection 116 extending inwardly beyond seat 115, such that the plug when engaged within the passage has a secure seat therein and is not apt to become accidentally disengaged. The advantage of the described construction is that the small air outlet as so provided is not apt to become clogged with dirt, as would inevitably occur if the air passage were simply a small hole, of area equivalent to the effective air outlet area in my construction. In the construction here shown, ordinary cleaning of the extraction chamber, with the filter and spring removed, will result in maintaining the relatively large passageway 111 in a clean condition, without particular attention being given to it. Then, when the filter is mounted in place and the spring end inserted in the air outlet passageway, said passageway is restricted to the proper relatively small effective cross-sectional area. The purpose and effect of this air discharge passage will appear from the following description of the operation of the apparatus.

Filter 95 being in place within the extraction chamber, and cover member 20 being removed, ground coffee in the desired amount is placed in the extraction chamber, and the chamber is then closed. In the specific form of apparatus shown in Fig. 1, this closing of the extraction chamber is done by first placing the chamber in position in the top of the boiler, and then mounting top member 20 and pipe fitting 54 in position and engaging clamp device 27 and bail 66. A proper quantity of water is of course first placed within boiler 40. The quantity of water required to be placed in the boiler may be estimated by first filling the boiler up to the level of outlet 49, and then adding water approximately equal to the quantity of coffee beverage which it is desired to prepare.

The apparatus is then placed over any suitable source of heat, as an ordinary gas burner flame. It will be observed that the bottom 11 of the coffee extraction chamber closes the upper side of the boiler, and will consequently receive heat from the water being heated within the boiler, and will transmit such heat to the interior of the coffee extraction chamber to preheat the ground coffee contained therein while still in a dry condition. As previously mentioned, this dry preheating of the coffee in a closed vessel appears to bring about a release of certain aromatic oils from the ground coffee, and also to prepare the remainder of the aromatic or volatile essence of the coffee for rapid assimilation by water. But because no water is present there is no beginning of extraction of the non-volatile and water-soluble elements, which include the undesirable parts of the coffee. The extraction chamber being sealed except for the discharge spout, most of the resulting aromatic gases or vapors produced by this preheating operation are confined within the chamber. The relatively small proportion of the vapor which may pass through the filter and into the outlet passageway, or through the air outlet passageway 111, are apparently, in practice, preserved by the fact that they condense on the walls of the discharge passageway and are subsequently taken up by the coffee beverage as it is finally discharged. It has been found that not enough of these aromatic vapors pass out into the room to be detected, although if the cover of the chamber be prematurely removed at the end of the preheating stage, a strong escape of aroma will occur.

It will be evident that the preheating might also be accomplished by separately heating the extraction chamber (with cover 20 in place) before the chamber is placed on the boiler. The preheating temperature is close to or at 100° C., and should not be continued for longer than two or three minutes at that temperature, as otherwise the coffee will be given a bitter taste. This is especially to be guarded against when preheating is done separately, as just mentioned.

The described preheating of the coffee in a dry state is very beneficial to the character of the final coffee beverage; however, while it always is desirable to incorporate the preheating operation, it is not essential to the other aspects of the invention that preheating be included.

It will be evident that in the form of apparatus shown in Fig. 1, the preheating step described is obtained incidentally by virtue of conduction of heat through extraction chamber bottom 11 as the water in boiler 40 rises in temperature.

As the water within the boiler increases in temperature, the air in the upper part of the boiler expands, and is allowed to escape by way of bleeder hole 84; this provision avoids premature build-up of pressure within the boiler and flow of luke warm water outwardly by way of outlet 49 and pipe 50. However, this bleeder hole is not sufficiently large to allow equalization of pressure within and without the boiler after the water within the boiler reaches a boiling temperature, with the result that pressure is finally built up in the upper part of the boiler forcing out water by way of outlet 49 and pipe 50. The pressure thus produced in the upper portion of the boiler exceeds atmospheric pressure, and the temperature of the water is accordingly permitted to rise above boiling temperature at atmospheric pressure. Accordingly, the water rising in pipe 50 is backed up by super-atmospheric pressure, and may be at a temperature above 100° C. Shut-off valve 70 being open, this water flows upwardly through pipe 50 and fitting 54 and discharges in a flat downwardly directed jet from the nozzle member 61 mounted in the extraction chamber cover. The water thus introduced to the extraction chamber has of course been somewhat cooled during its rise in pipe 50, but is still near 100° C.

The water so introduced to the extraction chamber then rises up to the level of air vent 111, air previously contained within the chamber escaping through vent 111 past corrugated plug 110 and passing outwardly by way of spout 18. The liquid level is prevented from rising further within the chamber by virtue of a "diving-bell" action of the dome shaped top 20.

The jet of water issuing from orifice 62 is so directed as to strike the liquid level surface as thus established approximately in the center, and the jet being under considerable pressure, maintains the entire liquid within the chamber in a state of vigorous agitation. Coffee grounds tending to rise to the surface are repeatedly submerged by this agitating action, and the liquid within the entire chamber is maintained in a state of constant motion, so that no accumulation of coffee grounds in beds or layers is permitted. Maintenance of the coffee grounds in a state of free suspension in a relatively large quantity of liquid, and prevention of settling of the grounds on the chamber bottom, or rising to float as a cake at the top, is a major characteristic of my process and apparatus. Agitation in the forms shown is accomplished by jet action, but any other method that creates enough agitation will fall within the spirit of the invention, if in combination with the other elements of the invention, and producing the same effect. Without this action, the coffee is subject to spoilage due to existence of relatively extreme conditions of pressure and/or temperature.

The design and adjustment of the apparatus of course determines the temperature at which the water is introduced to the chamber. Thus, the maximum boiler pressure, and consequently the maximum temperature of the water discharged from the boiler, is determined, in the apparatus of Fig. 1, by the adjustment of the boiler blow-off valve, which is constituted by the extraction chamber bottom. It will be remembered that adjustment of the spring of the extraction chamber hold-down clamp regulates the steam pressure at which the chamber will lift and permit blow-off of steam past sealing washer 44. This adjustment therefore regulates the temperature of the water sent to the extraction chamber, and the pressure backing it up. As previously mentioned, there is a certain cooling of the water in passing through the inlet pipe. If the initial temperature is not too high, this cooling effect will bring the temperature of the water down to a proper usable level at which the beverage does not boil, or suffer ill effects from excessive heat. Higher pressures may be obviously used by increasing the water cooling surfaces.

As previously stated, when the herein described coffee making conditions are established, thorough and continuous agitation of the liquid within the chamber is of utmost necessity, as otherwise spoilage of the coffee is inevitable. The reasons for such spoilage under the conditions of which I speak are not entirely obvious, although they may be due to concentration of extracted volatile oils and vapors held in the form of a foam of minute bubbles within the bed of coffee grounds, when such beds are not constantly broken up. Certain reagents, probably acid, are present in a relatively high concentration in the bubble walls and liquid of the foaming crust and settled bed of grounds. At the temperatures employed, this concentration is sufficient to cause a chemical reaction, resulting in the spoilage before mentioned. If the bed and floating cake of grounds are constantly broken up, and each individual particle of coffee constantly washed by an ever-changing bath of water, such concentration of any of the reagents is never permitted, and so no reaction will take place. Whether or not this theory is fully accountable, it is necessary to emphasize the absolute necessity of thorough agitation, as without it my apparatus would produce a very poor and undrinkable grade of coffee.

It is of course not essential to my invention, considered in its broader aspects, that the agitation spoken of be accomplished through jetting of the introduced hot water. This form of the invention is simply illustrative of any suitable means capable of thoroughly agitating the liquid within the extraction chamber during the introduction of the hot water and its flow through the chamber.

The form of my invention specifically shown in Fig. 1 incorporates the water discharge nozzle in the removable top or dome of the extraction chamber, so that the introduced water is jetted downwardly onto the liquid level established by air vent 111. It will be evident that this construction is of particular advantage, in that the liquid level is prevented from rising to the level of the discharge orifice by virtue of a "diving-bell" action of the dome, and it is therefore impossible for the liquid level to rise substantially above the discharge orifice, which condition might result in interference with thorough agitation of the liquid at its upper surface.

When, in the operation of the apparatus, the liquid level has risen to the level of the air discharge vent at 111, further introduction of hot water, or of steam, to the chamber causes a further increase of pressure therein, and forces the coffee to flow through the filter bag and to discharge by way of passageway 15 and spout 18. Such automatic discharge of coffee then continues until the water in the boiler has fallen to the level of its discharge outlet 49, and until steam from the boiler has followed up the discharged water and has forced the remainder of the coffee through the filter and out the spout. Thus, in this method of operation, the discharge of the prepared coffee from the apparatus is entirely automatic in character; the coffee extraction chamber first filling with water, and when the liquid level has risen to the height of the air vent at 111, further introduced water causing coffee to be discharged through the discharge spout, while maintaining the liquid level at the height of the air vent, and when introduction of water through the coffee chamber ceases, steam from the boiler following it up and forcing the remaining coffee to flow from the chamber.

The process is susceptible to several variations. For instance, the quantity of water in the boiler may be just sufficient to fill the extraction chamber up to the level of the air vent, after which steam is at once introduced to the chamber to accomplish the automatic discharge. Thus, in this instance all of the water is introduced to the chamber before any beverage is drawn off. A similar result of course obtains where any smaller quantity of water is used.

If conditions are such that flow through the apparatus is too rapid, resulting in incomplete extraction, the flow may be stopped for a short time after the chamber has become filled with water by closing valve 70 for a short time, and then allowing the inflow to resume. This of course interrupts agitation of the liquid within the chamber, but I find that interruption of agitation does not result in spoilage of the coffee when inflow of the highly heated water is simultaneously cut off.

Attention is particularly called to the vertically elongated form of filter illustrated in Fig. 1. This filter is of especial advantage because of the large filter area which it affords. A filter of small area is found in practice to cause excessive back pressure, with the result that the liquid passing through the water inlet jet does not discharge with sufficiently high velocity to produce the agitation required. A filter of the form illustrated, on the other hand, permits the offering of a filter of sufficient surface without increasing unduly the bottom area of the chamber, and with it the cover size. The back pressure offered by the filter (in combination with the air outlet at 111) can then be established at that amount which is insufficient to diminish the energy of the inlet jet below the degree of effectiveness required. The filter should, on the other hand, be small enough that it will not take up excessive space within the chamber, and interfere with agitation.

I will now proceed with the description of modified forms of apparatus which are designed with the particular view of increasing the pressures and temperatures usable, by controlling pressures and temperatures independently of one another. In all forms of the apparatus in which the input velocity of the injected hot water is relied upon for agitation of the liquid within the extraction chamber, it is essential that an adequate pressure differential be maintained between boiler and extraction chamber. This condition can not be established if the water in the extraction chamber retains a temperature at which boiling would occur at the obtained extraction chamber pressure, it being an essential requirement that free boiling of the liquid in the chamber be avoided. Furthermore, if the water in the chamber equals the boiler water in temperature, the vapor thereof will create a back pressure equal to boiler pressure. The desired differential of pressure, with a mixing chamber temperature established at the described value, may be secured by the following illustrative forms of apparatus which are in accordance with the present invention.

One such form of apparatus is shown in Fig. 8. In that figure, which is partially diagrammatic, the coffee extraction chamber is indicated at 130, and a comparatively high top or dome therefor is shown at 131, dome 131 in the present instance being of substantially the same size as chamber 130. The increased size of this dome 131 is a feature which may be used as an equivalent for an air vent at approximately the desired liquid level in chamber 130 (as used in the form previously described); however, an air vent may be used in the form of Fig. 8 in place of enlarged dome 131 if desired. Chamber 130 is mounted in the upper end of a closed tank 132, which is adapted to be filled with water up to such a level as is indicated. A pipe 133 extends from the lower portion of tank 132 and is coupled to a pipe 133a projecting through the wall of coffee extraction chamber 130, at a level above the water level in tank 132. Pipe 133a connects with a downwardly turned tube 133b, terminating in a downwardly directed jet 133c which in this instance is arranged to discharge below the normal liquid level in the chamber. A pipe 134 communicates with the upper end of tank 132, and is provided with a two-way valve 135, which is connected to pipes 136 and 137. Valve 135 is adapted to establish communication between pipes 134 and 136, or between pipes 134 and 137, as will be apparent from the figure. Pipe 136 is a steam escape pipe, while pipe 137 is connected to any source of gas pressure, not indicated.

A cloth covered filter member 140 is arranged in extraction chamber 130, and fits up around the lower end of a coffee draw-off pipe 141 which extends downwardly to the lower portion of the extraction chamber. The pipe 141 projects outwardly through the side wall of chamber 130, and connects to an exterior draw-off pipe 142 which may extend to an elevation above the upper end of the apparatus, if desired, in the manner shown in the figure. This draw-off pipe 142 is shown provided with a stop cock 143, and with a final discharge spout 144.

Water tank 132 is intended to be maintained at a constant temperature. For this purpose I here indicate an electric heating unit 148, connected to electrical leads 149, in one of which there is a bi-metallic thermostatic control element 150. It will be understood that element 150, which is mounted in proximity to the water in tank 132, so as to be affected by the heat conducted therefrom, will control the heating of tank 132. The adjustment of the thermostat is such as to maintain the temperature of the water within tank 132 at the desired operating temperature. Valve 135 is normally in the position shown, so that steam generated in tank 132 escapes through pipes 134 and 136. This prevents any build-up of pressure to a point above boiling in case of failure of the thermostat.

When it is desired to produce coffee, valve 135 is rotated to position to establish communication between pipes 134 and 137. In this position, gas under pressure in pipe 137 flows through the valve and through pipe 134 and into tank 132 to act downwardly on the water contained therein. This causes hot water to flow upwardly in pipe 133 and to be introduced to the coffee extraction chamber 130. In the arrangement shown, the outlet end of pipe 133 is pointed downwardly and is substantially parallel to the wall of the extraction chamber. The direction so given to the injected water maintains the liquid within the extraction chamber in a state of desired agitation. Air displaced by the water so introduced is in the specific form of apparatus of Fig. 8 caused to be compressed within the enlarged dome 131 of the apparatus, rather than being allowed to escape through an air vent, as in Fig. 1. When the pressure within chamber 130 has thus been built up to a certain value, coffee is forced through filter 140 and caused to discharge from the chamber through draw-off pipe 141, 142.

This form of apparatus is thus characterized by employment of hot water at a fixed, controlled temperature, which is independent of the pressure employed to produce the flow. The pressure within the water boiler which would be produced by self-generated steam is below that level required to produce a vigorous action of the water jet within the chamber. The water is then forced to flow from the water tank into the extraction chamber by employment of a separate source of pressure, which may be as high as desired. The final result is thus to introduce to chamber 130 hot water at the desired working temperature, backed up by a pressure as high as desired in excess of atmospheric pressure. The conditions are qualitatively the same as in the simple preferred form of Fig. 1, but in this form of apparatus there is additional provision for increasing the margin of pressure between the inlet source and the chamber without such an accompanying rise of temperature in the introduced water as will cause spoiling of the coffee brew.

Figure 9:
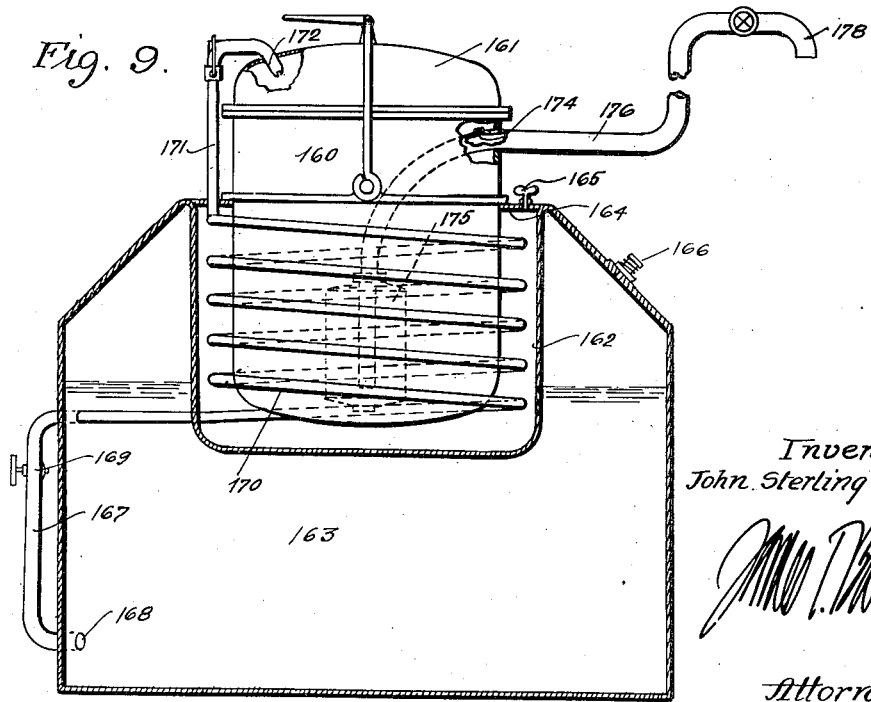
Fig. 9 is a diagrammatic view indicating another modified form of apparatus.

Fig. 9 shows another variational form of apparatus. In this instance the coffee extraction chamber is indicated at 160, and has a closed top or dome at 161. The lower end of chamber 160 is received within a well 162 formed in the upper end of an enclosed water boiler 163, said well having a cover 164 engaging the sides of the chamber with pressure-tight fit. Chamber 160 is spaced from the walls of well 162, as shown, and the well is filled with water up to such a level as is indicated. This water within well 162 is maintained in temperature down to 100° C. by releasing its pressure through valve 165, as is indicated. The upper end of boiler 163 is provided with a steam release valve 166, which may be set to control the boiler pressure at any value desired. A water outlet pipe 167 leads from boiler 163 from a point 168 near its bottom. This pipe 167 has a control valve 169, and above valve 169 extends inwardly and connects to a coil 170 arranged within well 162 and disposed about the lower end of chamber 160. The upper end of coil 170 connects to a pipe 171 which leads to a water discharge jet 172 discharging within chamber 160. As shown, jet 172 is mounted in chamber top 161.

A small air vent is indicated at 174, being in this instance placed at a proper point in draw-off pipe 176, and establishes the level of liquid within chamber 160. A cloth covered filter 175 is shown arranged about the lower end of draw-off pipe 176, the latter leading from the lower portion of chamber 160 and extending outwardly through the side wall thereof to connect to a discharge spout 178.

This form of apparatus is also typical of apparatus establishing considerable pressure back of the water injected to the extraction chamber, while permitting independent control of the temperature of the injected water. In the operation of this form of apparatus, the boiler 163 is heated, and the water therein may rise to a temperature above 100° C., the pressure within the boiler being allowed to increase to some value above atmospheric pressure before release valve 166 will open. The water within well 162 is heated from the boiler, but is prevented from rising above the temperature which it is desired for the inlet water because of release of excess pressure to atmosphere by way of valve 165. Hot water forced from the boiler by the development of pressure therein and passing upwardly through pipe 167 and coil 170 will be at boiler pressure, but will be reduced in temperature in passing through the coil 170, which is surrounded by water at the lower temperature which it is desired to establish within the extraction chamber. Consequently, the water injected into the coffee extraction chamber is at boiler pressure but at a temperature somewhat below boiler temperature.

These two cases (Figs. 8 and 9) are typical of means which produce such a differential of pressure through establishing an independent control of pressure in the inlet source, on the one hand, and temperature of the inlet water, on the other, giving better control of temperature conditions within the extraction chamber, and at the same time capability for a greater differential of pressure between the hot water source and the chamber, with resulting increased jet activity and improved agitation.

It is to be noted that each of the three forms of apparatus now described have many individual features of novelty and invention not shown in the other illustrative forms. It will be understood that these various features are contemplated as parts of my invention as a whole, and that many of the features shown on any one of the separate illustrative embodiments may be employed in combination with other features shown on the other forms, or with other equivalent forms of apparatus not specifically illustrated.

It is further to be understood that while I have now illustrated my invention by describing in detail several specific forms of illustrative apparatus, and by describing my preferred method of making coffee with the use of such apparatus, such typification is for illustrative purposes only, and the invention is to be limited only as may fairly be construed from the following claims.

I claim:

1. In a coffee making apparatus, the combination of a closed coffee infusion chamber, a conduit for conveying hot water to the chamber, an air vent near the upper end of the chamber allowing air which has been displaced in the lower portion of the chamber by the introduced hot water to escape, means causing the coffee grounds and hot water within the chamber to be continuously agitated, a filter controlled coffee draw-off conduit leading in an upward direction from the lower portion of said chamber, and means for impressing a differential of pressure on the hot water inlet and the coffee draw-off conduit such that water flows into the chamber and rises to and slightly above the air vent, followed by flow of liquid from the coffee draw-off conduit.

2. In a coffee making apparatus, the combination of a closed coffee infusion chamber, a conduit for conveying hot water to the chamber, an air vent near the upper end of the chamber allowing air which has been displaced in the lower portion of the chamber by the introduced hot water to escape, means causing the coffee grounds and hot water within the chamber to be continuously agitated, a filter controlled coffee draw-off conduit leading in an upward direction from the lower portion of said chamber to a level at least substantially as high as the air vent, and means for introducing hot water to the inlet conduit under sufficient pressure to flow into and fill the chamber up to and slightly above the air vent and thereafter to flow from the coffee draw-off conduit.

3. In a coffee making apparatus, the combination of a closed coffee infusion chamber, a conduit for conveying hot water to the chamber, a jet on the discharge end of said conduit for discharging the water within the chamber at a sufficient velocity to vigorously agitate the liquid and coffee grounds in the chamber, an air vent near the upper end of the chamber allowing air which has been displaced in the lower portion of the chamber by the introduced hot water to escape, and acting to establish the level to which the introduced water may rise within the chamber, a filter controlled coffee draw-off conduit extending upwardly from the lower portion of the chamber to substantially at least the level of the air vent, and means for introducing hot water to the inlet conduit under sufficient pressure to flow into and fill the chamber up to and slightly above the air vent and to rise in the coffee draw-off conduit to substantially the level of the air vent, and thereafter to flow from the coffee draw-off conduit.

4. In a coffee making apparatus, the combination of a closed coffee infusion chamber, a conduit for conveying hot water to the chamber, a jet on the discharge end of said conduit for discharging the water within the chamber at a sufficient velocity to vigorously agitate the liquid and coffee grounds in the chamber, a filter controlled coffee draw-off conduit extending upwardly from the lower portion of the chamber, an air passage leading from a point in the upper end of the chamber into said upwardly extending coffee draw-off conduit, said air passage allowing air which has been displaced in the lower portion of the chamber by the introduced hot water to escape by way of the coffee draw-off conduit, and acting to establish the level to which the introduced water may rise within the chamber, and means for introducing hot water to the inlet conduit under sufficient pressure to flow into and fill the chamber up to and slightly above the air vent and to rise in the coffee draw-off conduit to substantially at least the level of the air vent, and thereafter to flow from the coffee draw-off conduit.

JOHN STERLING COMSTOCK.